2,196,332

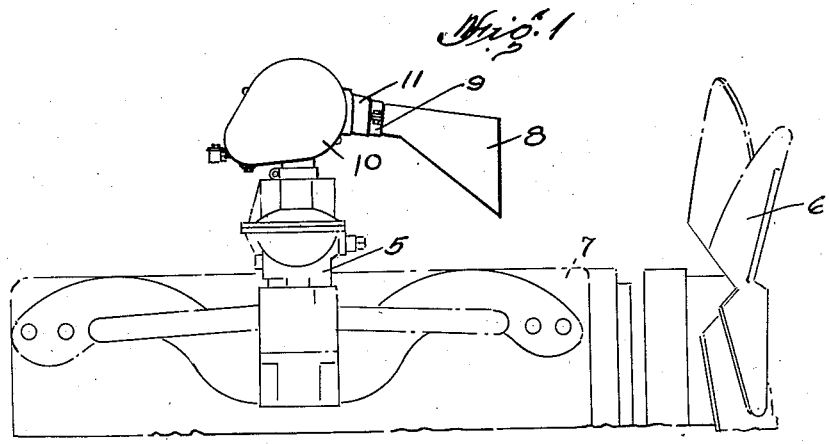
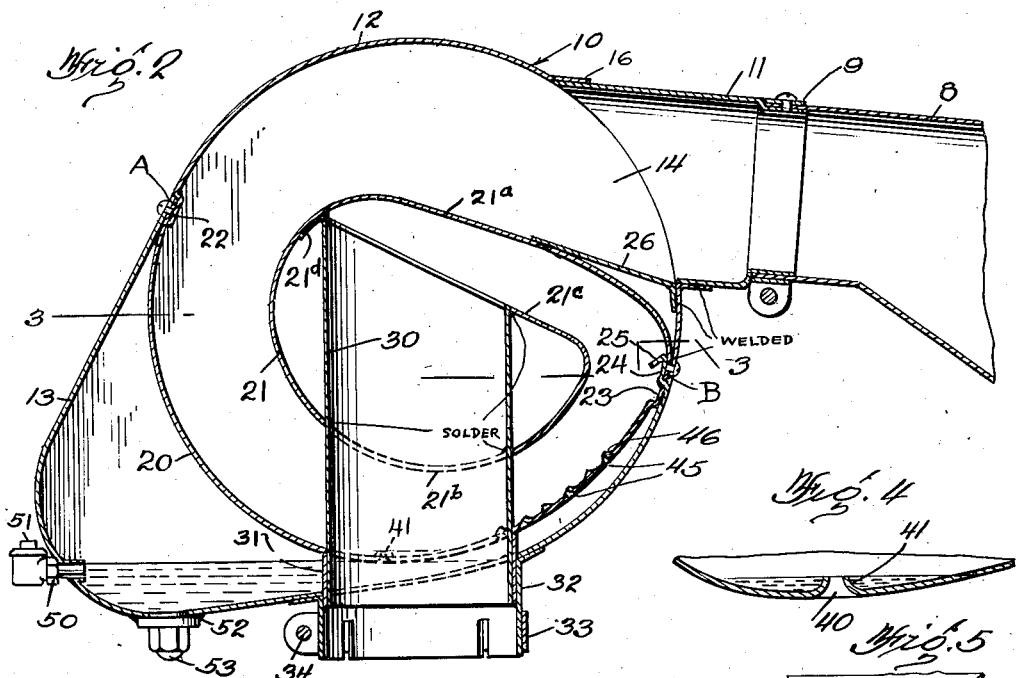
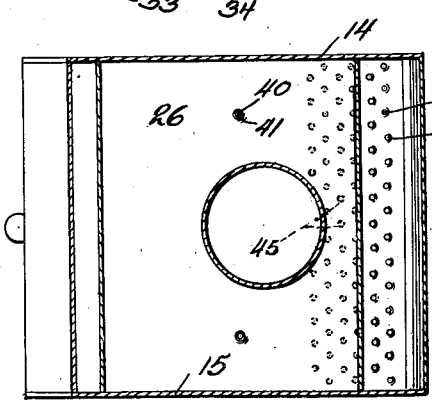
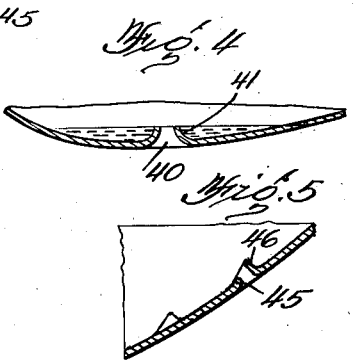
April 9, 1940. R. P. BAILE 2,196,332
SUPERCHARGER FOR INTERNAL COMBUSTION ENGINES
Filed Feb. 9, 1938
Inventor
Roland P. Baile Patented Apr. 9, 1940

UNITED STATES PATENT OFFICE 2,196,332

SUPERCHARGER FOR INTERNAL COMBUSTION ENGINES

Roland P. Baile, Medford, Md., assignor, by mesne assignments, to Standard Supercharger Corporation, New York, N. Y., a corporation of New York Application February 9, 1938, Serial No. 189,692

7 Claims. (Cl. 183—26)

This invention relates to superchargers for internal combustion engines, and in its more specific aspects to a supercharger for inducing cleaned air under positive pressure to the carburetor of an automotive engine of standard construction.

Among the objects of the present invention may be noted the provision of a supercharger of simple design, which is nevertheless highly efficient in its operation; the provision of a supercharger having no moving parts and which is thus inexpensive in construction and installation, and which is further characterized by long life; the provision of a supercharger having combined therewith efficient air cleaning means; and the provision of a supercharger of the stated character, which may be attached as standard equipment to automotive engines at the factory, or which may be sold and applied as an accessory to existing automotive engines.

Other objects will be in part obvious and in part hereinafter pointed out in connection with the following analysis of this invention wherein is illustrated an embodiment of the invention in detail.

In the drawing—

Fig. 1 is a side elevation of the supercharger of the present invention associated with the carburetor of an automotive engine;

Fig. 2 is a section taken on the longitudinal center line of the supercharger illustrated in Fig. 1;

Fig. 3 is a section on a reduced scale along lines 3—3 of Fig. 2;

Figs. 4 and 5 are enlarged part-section views of details of construction.

Referring now to the drawing wherein like reference characters designate like parts throughout the several views, the supercharger of the present invention is illustrated in Fig. 1 as delivering to the air intake of a carburetor 5 of the down draft type, being preferably arranged rearwardly of a fan which may be the conventional cooling fan of an automotive engine 7 so as to collect air under pressure from the air stream of the fan. In its flow through the supercharger as will be described, both the pressure and the forward velocity of the air is increased and the air is cleaned, whereby an increased volume of cleaned air is supplied to the carburetor 5.

Pressure air from the fan stream is collected by an intake funnel 8 whose open mouth is disposed rearwardly of the fan 6, the delivery end of the funnel being connected as by a securing strap 9 to the substantially horizontal inlet connection 11 of the supercharger body or shell generally designated 10. This body is disposed on a horizontal axis extending transversely of the engine 7 and is preferably constituted by upper and lower shaped metallic sheets 12, 13 welded or otherwise secured at their meeting ends to form the joints A and B, the sheets extending between the side plates 14, 15 (Fig. 3) to which they are preferably welded. The upper sheet 12 may extend along a 180° arc of substantially constant radius, and its upper forward portion is provided with an air inlet opening defined by the flange 16, to which the inlet connection 11 is secured as by welding. The lower sheet 13 is roughly V-shaped in section, the apex being preferably curved and extending downwardly and rearwardly to form a rearward extension of the body proper.

Arranged within the body are the relatively spaced deflector plates 20, 21, which extend the full width of the body, being suitably secured to the side plates 14, 15 as by welding or riveting. One end of the relatively outer plate 20 is secured between the meeting ends of the sheets 12, 13 at the joint A, the sheet 12 being provided with a lip 22 which extends over the end of the plate 20, thus to properly position and secure the latter. The plate 20 is shaped to form in effect a continuation of the inner surface of the upper sheet 12 and, being arcuately formed, extends downwardly and thence upwardly along an arc of gradually decreasing radius. The other end of the plate 20 is shaped to extend outwardly as at 23, thus to lie against the inner surface of the lower body sheet 13 to which it is secured as by welding adjacent the joint B.

Considering now the relatively inner deflector plate 21, one end thereof is secured as by welding between the meeting ends of the sheets 12, 13 at the joint B, the sheet 13 being provided with an inwardly directed lip 24 functioning as an abutment for the end of plate 21. Extending inwardly and downwardly from the lip 24 is a baffle extension 25 extending the full width of the body, the purpose of which will be stated hereinafter.

From its point of securement as described, the plate 21 is shaped to provide an upwardly sloped and rearwardly extending stretch 21a which forms with the body sheet 12 an air passage which is in effect a continuation of the air inlet passage through the inlet connection 11. Thereafter the plate 21 is turned or coiled on itself, having a downwardly and thence upwardly curved portion 21b which is so spaced from the outer plate 20 as to form therewith an air passage of gradually decreasing area, and a stretch 21c which extends substantially straight-way and at an angle approximately 45° to the horizontal. The stretch 21c terminates in a flange 21d which lies against the under surface of the plate and is preferably welded thereto.

In order to insure a smooth flow of the air entering the body, a bridge plate 26 is provided to extend between the interior of the sheet 12 adjacent the lower side of the inlet opening thereto and the inclined stretch 21a of the plate 21, the bridge plate being welded along its lines of connection with the sheet 12 and plate 21. A vertical outlet tube 30 has its top portion secured as by soldering to the under face of the stretch 21c of the plate 21, this stretch portion being cut away to provide communication between the air passage formed between the plates 20, 21 and the outlet tube 30. Suitable openings are provided in the plates 20, 21, and body sheet 13, through which the lower portion of the outlet tube 30 may extend, the tube terminating well below the lowermost portion of the outer deflector plate 20 and exteriorly of the supercharger body. Preferably, this outer plate has a circular flange 31 about its tube opening, the flange being disposed about the tube and serving to provide a rigid mounting therefor.

Preferably, the outlet tube 30 is arranged on the transverse vertical center line of the supercharger body, and disposed coaxially with reference to the tube and extending below the lower end thereof is a split collar 32 secured as by soldering to the outer surface of the sheet 13. The collar 32 is provided with a strap 33 and adjusting screw 34 whereby the device may be attached as a unit to the carburetor 5 in such manner that the outlet tube 30 extends into the air intake of the carburetor or is otherwise connected therewith.

With the parts so far described, it will be observed that air under pressure from the air stream set up by rotation of the fan 6 will be collected by the intake funnel 8 and enters the supercharger body through the horizontally disposed inlet thereto. By reason of the arrangement of deflector plates which provide a substantially closed air passage, air so delivered to the supercharger body is caused to move in a generally spiral or volute path about the horizontal axis of the body, whereupon it is delivered to the vertical outlet tube 30 which extends through the air passage, the inlet to which is at a relatively high level and generally beneath the body inlet. In its flow from the large-area inlet opening of the funnel 8 to the point of greatest restriction in the air passage, both the pressure and the velocity of the air is increased, with the result that a relatively large volume of high velocity air is available for supply to the carburetor through the tube 30. While there may result some slight decrease in air velocity due to the relatively larger area of the tube 30, the carburetor intake opening acts as a further restriction for the air passing through the tube, so that the relatively high velocity of the air is in effect maintained.

Due to the high velocity of the air and the roughly circular path of movement of the air in its passage through the supercharger body, heavy dust or dirt particles contained in the incoming air stream are thrown outwardly by centrifugal action and deflected by the inner surface of the outer deflector plate 20, tending by gravity to collect in the lower portion thereof. In order to prevent separated particles of dust from moving forward with the stream of air, and in order further to improve the cleaning of the air over that which would result only from centrifugal separation as aforesaid, the present invention makes provision for bringing the air stream into contact with the surface of a pool and/or film of oil maintained in the lower portion of the air passage whereby the dust or dirt particles which otherwise would be carried along in the air stream are held by the oil against such further movement.

To this end, the rearward body extension formed by the sheet 13 and the related portions of the side plates 14 and 15 form a closed oil chamber or reservoir in which a body of oil is maintained at a level about that of the lowest portion of the outer deflector plate 20. By reference to Figs. 3 and 4 the outer plate 20 along its lowermost portion and somewhat rearwardly (Fig. 2) of the longitudinal center has its body provided with holes 40, preferably two in number, each hole being spaced midway between a side plate and the outlet tube 30. Each of said holes 40 is defined by a lip 41 of appreciable height which extends all around the holes 40, as more clearly shown in Fig. 4. In making its circuit of the supercharger body, the air at its high forward velocity causes sufficient oil to be raised through the openings 40 as to provide, in conjunction with the lips 41 around the holes, a small pool of oil of appreciable surface area within the lower curved portion of the air passage. Thus, the centrifugally separated dust particles tending to collect on the curved wall surface of guide plate 20 and sliding downwardly thereon, are collected by the body of oil so maintained in the air passage and are accordingly restrained from moving forward with or being re-entrained in the air stream in the latter portion of its travel.

Relatively in advance of and arranged on a higher level than the holes 40, the deflector plate 20 is provided with a multiplicity of additional holes 45 (Figs. 3 and 5), there being, for example, six rows of fourteen holes, with the rows extending the full width of the plate 20 and being staggered with relation to adjacent rows. By reference to Fig. 5 these holes are each defined by a lip 46 on its relatively upper half only. Thus, as the air stream moves over the series of holes 45, the lips 46 thereof provide a mechanical "scrubbing" surface which acts to separate dust particles from the air stream and further cleans the air of dust particles which may have escaped the lower oil bath. In addition, the holes 45 and their lips 46 prevent any substantial advance movement of the oil pool as might otherwise occur if the vehicle were traveling down a steep incline, the holes 45 further providing a path of oil return for oil traveling upwardly in film form on the surface of the plate 20 between the oil pool and the openings 45 aforesaid, as results in normal operation of the supercharger by reason of the high velocity of the air stream.

Referring to the previously described baffle extension 25 of the lower sheet 13, this baffle extension is, as will be seen from Fig. 2, arranged in advance of and at a higher level than the openings 45. Accordingly the baffle acts to supplement the collecting and cleaning action aforesaid.

In the lower portion of the body, there is provided an oil inlet nipple 50 having a filling plug 51, the sloped bottom of the body having a drain fitting 52 adapted to be closed by a drain plug 53. By the above arrangement of filler and drain openings, the reservoir can be maintained filled to the proper level with the assurance that sufficient oil is maintained in the reservoir as to effect the efficient cleaning desired. At suitable intervals the oil may be drained from the reservoir and the parts suitably flushed, thus to insure efficient cleaning.

It will be observed that the air cleaning features just described may be incorporated in the previously described supercharger construction without any substantial modification of the latter, with the cleaning means utilizing to a major extent the parts forming the supercharger proper. In consequence, the present construction provides a simple yet highly efficient supercharger having the added function and advantage of inducing air which has been efficiently cleaned to the air intake of a carburetor.

As many changes could be made in carrying out the above constructions without departing from the scope of the invention, it is intended that all matter contained in the above description or shown in the accompanying drawing shall be interpreted as illustrative and not in a limiting sense.

I claim:

1. A combined supercharger and air cleaner adapted for attachment to the air intake of a carburetor, comprising a substantially horizontally disposed funnel-shaped inlet means whose enlarged end is adapted to collect air from a moving air stream, a vertically disposed outlet means having at its lower end provisions for securing the device to the carburetor intake, a substantially spiral passage connecting the reduced end of the inlet means and the upper end of the outlet means, said passage being of gradually decreasing section whereby to increase the forward velocity of the air flowing therethrough and extending about a horizontal axis whereby dirt particles are thrown outwardly by centrifugal action and are deflected downwardly into the lower portion of the passage wherein they tend to collect, means providing a liquid reservoir adjacent said lower portion of the passage, and means for supplying a limited quantity of liquid from the reservoir to said lower portion of the passage whereby to effect therein separation of the deflected dirt particles and to prevent their reentrainment into the air stream moving therethrough.

2. A combined supercharger and air cleaner adapted for attachment to the air intake of a carburetor, comprising a substantially horizontally disposed funnel-shaped inlet means whose enlarged end is adapted to collect air from a moving air stream, a vertically disposed outlet means having at its lower end provisions for securing the device to the carburetor intake, a substantially spiral passage connecting the reduced end of the inlet means and the upper end of the outlet means, said passage being of gradually decreasing section whereby to increase the forward velocity of the air flowing therethrough and extending about a horizontal axis whereby dirt particles are thrown outwardly by centrifugal action and are deflected downwardly into the lower portion of the passage wherein they tend to collect, means providing a liquid reservoir adjacent said lower portion of the passage, and means for circulating liquid in limited quantity from the reservoir through said passage lower portion and back to said reservoir, whereby to effect the separation of the deflected dirt particles from the moving air stream and to remove the so separated particles from the air passage.

3. A combined supercharger and air cleaner adapted for attachment to the air intake of a carburetor, comprising a substantially horizontally disposed funnel-shaped inlet means whose enlarged end is adapted to collect air from a moving air stream, a vertically disposed outlet means having at its lower end provisions for securing the device to the carburetor intake, a substantially spiral passage connecting the reduced end of the inlet means and the upper end of the outlet means, said passage being of gradually decreasing section whereby to increase the forward velocity of the air flowing therethrough and extending about a horizontal axis whereby dirt particles are thrown outwardly by centrifugal action and are deflected downwardly into the lower portion of the passage wherein they tend to collect, means providing a liquid reservoir adjacent said lower portion of the passage, and means for supplying liquid in limited quantity from the reservoir to said passage lower portion and providing for the return thereof to the reservoir after contacting a substantial area of the outer passage wall, whereby to separate the deflected dirt particles and to remove the so separated particles from the air passage.

4. A combined supercharger and air cleaner adapted for attachment to the air intake of a carburetor, comprising a substantially horizontally disposed funnel-shaped inlet means whose enlarged end is adapted to collect air from a moving air stream, a vertically disposed outlet means having at its lower end provisions for securing the device to the carburetor intake, a substantially spiral passage connecting the reduced end of the inlet means and the upper end of the outlet means, said passage being of gradually decreasing section whereby to increase the forward velocity of the air flowing therethrough and extending about a horizontal axis whereby dirt particles are thrown outwardly by centrifugal action and are deflected downwardly into the lower portion of the passage wherein they tend to collect, means providing a liquid reservoir adjacent said lower portion of the passage, and means for causing and permitting liquid from the reservoir to move in a path including said lower passage portion whereby to separate the deflected dirt particles from the moving air stream and to remove the so separated particles from the air passage.

5. A combined supercharger and air cleaner adapted for attachment to the air intake of a carburetor, comprising a substantially horizontally disposed funnel-shaped inlet means whose enlarged end is adapted to collect air from a moving air stream, a vertically disposed outlet means having at its lower end provisions for securing the device to the carburetor intake, a substantially spiral passage connecting the reduced end of the inlet means and the upper end of the outlet means, said passage being of gradually decreasing section whereby to increase the forward velocity of the air flowing therethrough and extending about a horizontal axis whereby dirt particles are thrown outwardly by centrifugal action and are deflected downwardly into the lower portion of the passage wherein they tend to collect, means providing a liquid reservoir adjacent said lower portion of the passage, and means for causing and permitting liquid from the reservoir to move in a path including said reservoir, said lower passage portion, and also a substantial area of the outer wall of the air passage which extends upwardly from the latter in the direction of air flow, whereby to effect separation of the deflected dirt particles from the moving air stream and to remove the so separated particles from the air pressure.

6. In a device of the character described, a substantially horizontally disposed funnel-shaped inlet means, a vertically disposed outlet means, a passage of gradually decreasing section whose center line extends along a vertically disposed spiral, the passage connecting the reduced end of the inlet means with the upper end of the outlet means, the vertical outlet means extending through and below the lowermost portion of the passage and having at its lower end provisions for securing the device to the intake of a carburetor, a liquid reservoir adjacent the passage, and supply and return connections between the reservoir and said lowermost portion of the passage.

7. A combined supercharger and air cleaner adapted for attachment to the air intake of a carburetor, comprising a substantially horizontally disposed funnel-shaped inlet means whose enlarged end is adapted to collect air from a moving air stream, a vertically disposed outlet means having at its lower end provisions for securing the device to the carburetor intake, a substantially closed, spiral passage connecting the reduced end of the inlet means and the upper end of the outlet means, said passage being of gradually decreasing section throughout its length whereby to increase the forward velocity of the air flowing therethrough and extending about a horizontal axis whereby dirt particles are thrown outwardly by centrifugal action and are deflected downwardly into the lower portion of the passage and thence upwardly along a curved outer wall defining the upwardly extending portion of said spiral passage, and a closed chamber for the separated dust particles adjoining said lower portion and communicating with said upwardly extending portion of said passage through a dust-discharge opening in said outer wall which is disposed intermediate the lower passage portion and said upper end of the outlet means, whereby dust particles deflected upwardly and moving along the outer wall of the upwardly extending passage portion pass therefrom through said opening and collect in said chamber.

ROLAND P. BAILE.